J. F. O'CONNOR.
SIDE BEARING FOR SIX WHEELED PASSENGER CAR TRUCKS.
APPLICATION FILED JAN. 2, 1914.
1,133,573.
Patented Mar. 30, 1915.
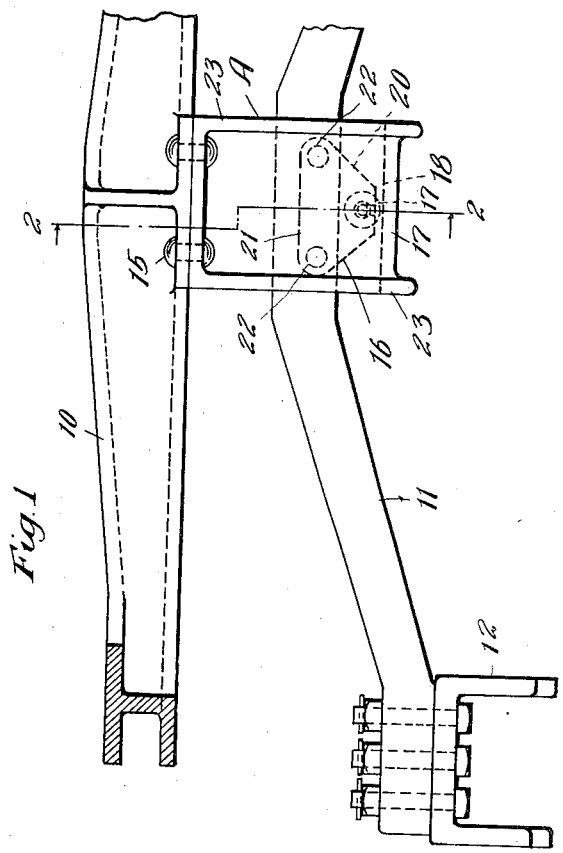
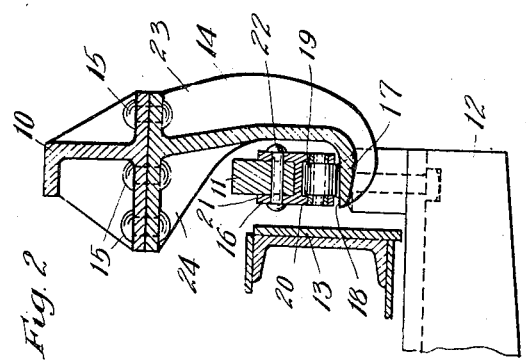
WITNESSES:
Ray E. Fordice
Wm. Geiger
INVENTOR.
John F. O'Connor
BY
Munday, Evarts, Adcock & Clarke
his ATTORNEYS.

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

SIDE BEARING FOR SIX-WHEELED PASSENGER-CAR TRUCKS.

1,133,573.

Specification of Letters Patent. Patented Mar. 30, 1915.

Application filed January 2, 1914. Serial No. 809,875.

*To all whom it may concern:*

Be it known that I, JOHN F. O'CONNOR, a citizen of the United States, residing in Chicago, in the county of Cook and State of Illinois, have invented a new and useful Improvement in Side Bearings for Six-Wheeled Passenger-Car Trucks, of which the following is a specification.

This invention relates to improvements in side bearings for six wheel passenger car trucks.

An object of the invention is to provide a side bearing more particularly adapted for use on passenger cars employing six wheeled trucks, which bearing operates under tension or when the adjacent parts of the body bolster and truck bolster tend to separate vertically from each other.

The invention furthermore consists in the improvements in the parts and devices and in the novel combinations of the parts and devices herein shown, described or claimed.

In the drawing forming a part of this specification, Figure 1 is a broken, detail side elevation of portions of a car body bolster and truck bolster showing my improvements in connection therewith and Fig. 2 is a vertical section taken on the line 2—2 of Fig. 1.

In said drawing 10 denotes a longitudinally extending member of a body bolster of a type commonly employed on passenger cars and 11 denotes a side bearing bar or bridge of a common form of six wheel passenger car truck, said bar or bridge being secured at its ends to bolsters 12 of the truck which are positioned relatively to the upper members of the truck side frame 13, as shown most clearly in Fig. 2.

The improved side bearing, designated generally by the reference A, comprises a hook-shaped casting 14 secured to the body bolster member 10 by means such as rivets 15, and a casting 16 secured to the under side of the side bearing bridge 11. The member 14 has, at its bottom, an inwardly extending horizontal flange 17, the top surface 18 of which is flat and forms the bearing surface which coöperates and engages with the anti-friction roller 19 mounted in depending arms 20 of the casting 16, the latter having upwardly extended side flanges 21 embracing the side bearing bridge 11 and secured thereto by rivets 22. The member 14 is braced and strengthened by end flanges 23 on its outer side and flanges 24 on its inner side.

From the preceding description it will be seen that my side bearing operates when the adjacent parts of the body bolster and truck bolster tend to separate in a vertical plane, which is the reverse of the operation of the side bearings now in general use. The side bearings now in general use operate under compression, that is, when the adjacent parts of the bolsters are moved toward each other, whereas my improved side bearing operates under tension. The side bearing shown in the drawing and described herein, is so constructed that it permits free relative angular movement between the truck and car body; the truck may be easily separated from the car body for repairs whenever desired by detaching the side bearing bridges; and the side bearing comprises few parts which may be easily and cheaply manufactured.

Several important results are obtained by the use of my improved side bearing structure, among which may be mentioned the following. As is well known, in rounding curves, the body has a tendency to be lifted up and separated from the trucks and with the types of side bearings now generally in use, there is nothing to prevent this action. With my type of side bearing, however, this defect is eliminated since the car body can not separate from the truck, the latter being, in effect, inseparably connected thereto, although relative movement therebetween is provided for. Also, on account of the side bearing connection which I have provided, the truck may be considered as constituting a part of the car body proper in calculating the center of gravity of the entire structure and hence the center of gravity is made lower than where no connection is provided between the car body and trucks. In the case of wrecks it is well known that the bodies and trucks become separated, since there is nothing to prevent the lifting of the body from the truck. With my type of side bearing this defect is overcome to a great extent and on account of the connection between the body and truck, the latter will increase the effective resistance to telescoping of adjacent cars. Hitherto, in the case of a wreck where two cars telescope, the trucks are simply pushed along under the car bodies when two bodies telescope and the trucks do not afford any material resistance to this telescoping action. With my connection, this result is also partly overcome.

Although I have herein shown and described what I now consider the preferred embodiment of my improvement, yet it will be understood that various changes and modifications may be made without departing from the spirit of the invention, and all such changes and modifications are contemplated as come within the scope of the claims appended hereto.

I claim:—

1. In a device of the character described, the combination with a member secured to the body-bolster of a car, of a truck-bolster having a side bearing bridge, said member having a substantially hook-shaped lower end extending beneath the under side of said bearing bridge, and an anti-friction roller carried by one of said elements and interposed between said member and the inner side of the bearing bridge, whereby when the car body tends to move away from the truck in a vertical plane, the same is limited by the engagement between said member and said bearing bridge.

2. In a device of the character described, the combination with a member secured to the body-bolster of a car, of a truck having a side bearing bridge, a bracket mounted on the under side of the bearing bridge, said bracket having an anti-friction roller mounted therein, and said member secured to the body-bolster having an inwardly extending flange at the lower end thereof, located beneath said anti-friction roller and adapted to engage the roller when the body-bolster moves away from the truck-bolster.

3. A side bearing for passenger cars having six-wheeled trucks and comprising a member secured to the body-bolster, said member having an inturned horizontal flange at the lower end thereof, a bracket secured to the side bearing bridge of the truck, said bracket having an anti-friction roller mounted therein, said roller coming into play between said member and the side bearing bridge when the body-bolster and the wheel truck tend to separate in a vertical plane.

JOHN F. O'CONNOR.

Witnesses:
WILLIAM A. GEIGER,
JOSEPH HARRIS.